US011989993B2

(12) United States Patent
Zhao et al.

(10) Patent No.: US 11,989,993 B2
(45) Date of Patent: May 21, 2024

(54) BANKNOTE ACCUMULATING DEVICE, LIMITING MECHANISM AND CASH RECYCLING AND HANDLING DEVICE

(71) Applicant: SHANDONG NEW BEIYANG INFORMATION TECHNOLOGY CO., LTD., Shandong (CN)

(72) Inventors: Zhenxing Zhao, Shandong (CN); Jiawu Tan, Shandong (CN); Yong Yuan, Shandong (CN); Chuntao Wang, Shandong (CN); Qiangzi Cong, Shandong (CN)

(73) Assignee: SHANDONG NEW BEIYANG INFORMATION TECHNOLOGY CO., LTD., Shandong (CN)

( * ) Notice: Subject to any disclaimer, the term of this patent is extended or adjusted under 35 U.S.C. 154(b) by 930 days.

(21) Appl. No.: 16/978,409

(22) PCT Filed: Mar. 7, 2019

(86) PCT No.: PCT/CN2019/077334
§ 371 (c)(1),
(2) Date: Sep. 4, 2020

(87) PCT Pub. No.: WO2019/174521
PCT Pub. Date: Sep. 19, 2019

(65) Prior Publication Data

US 2021/0049854 A1 Feb. 18, 2021

(30) Foreign Application Priority Data

Mar. 13, 2018 (CN) ......................... 201810206518.9

(51) Int. Cl.
*G07D 11/17* (2019.01)
*B65H 31/20* (2006.01)
(Continued)

(52) U.S. Cl.
CPC ............. *G07D 11/12* (2019.01); *B65H 31/20* (2013.01); *B65H 31/36* (2013.01); *G07D 11/17* (2019.01)

(58) Field of Classification Search
CPC ........ B65H 31/36; G07D 11/12; G07D 11/14; G07D 11/16; G07D 11/13; G07D 11/17
See application file for complete search history.

(56) References Cited

U.S. PATENT DOCUMENTS 6,032,948 A * 3/2000 Peebles .................. B65H 31/20 271/224
7,029,008 B2 * 4/2006 Nishida .................. B65H 31/26 271/223
(Continued)

FOREIGN PATENT DOCUMENTS

CN 101734506 A 6/2010
CN 206833581 U 1/2018
(Continued)

OTHER PUBLICATIONS

International Search Report issued by the State Intellectual Property Office of the P.R. China in connection with International Application No. PCT/CN2019/077334 dated May 27, 2019.

*Primary Examiner* — Luis A Gonzalez
(74) *Attorney, Agent, or Firm* — George Likourezos; Carter, DeLuca & Farrell LLP

(57) ABSTRACT

Disclosed is a banknote accumulating device, including a storage chamber and a limiting mechanism arranged above the storage chamber; the storage chamber includes an inlet for inputting banknotes; the limiting mechanism includes a reset member, a driving mechanism and multiple limiting members which can move independently of each other; the reset member is configured to enable each of limiting members to have a tendency to move to a first position; the driving mechanism is configured to selectively drive one of
(Continued)

the multiple limiting members to move from a first position to a second position, so that the limiting part of the limiting member reaches in the moving path of the banknotes in the storage chamber; the distances between the positions of the limiting parts of multiple limiting members in the moving path and the inlet are different. Further disclosed are a limiting mechanism and a cash recycling and handling device.

20 Claims, 9 Drawing Sheets

(51) Int. Cl.
*B65H 31/36* (2006.01)
*G07D 11/12* (2019.01)

(56) References Cited

U.S. PATENT DOCUMENTS

2007/0278736 A1* 12/2007 Onodera ................ B65H 29/26
271/178
2020/0302725 A1* 9/2020 Oh ......................... B65H 31/10

FOREIGN PATENT DOCUMENTS

| | | | |
|---|---|---|---|
| JP | 11147652 | A | 6/1999 |
| WO | 2008111156 | A1 | 9/2008 |

* cited by examiner

10

BANKNOTE ACCUMULATING DEVICE, LIMITING MECHANISM AND CASH RECYCLING AND HANDLING DEVICE

This application claims priority to Chinese patent application No. 201810206518.9 filed with CNIPA on Mar. 13, 2018, disclosure of which is incorporated herein by reference in its entirety.

TECHNICAL FIELD

The present disclosure relates to the field of financial self-service apparatus, such as a banknote accumulating device, a limiting mechanism and a cash recycling and handling device.

BACKGROUND

The bill recycling terminal is a financial self-service apparatus with the plurality of functions such as banknote recycling, depositing, withdrawing, temporary storage, sorting, counting, identification, serial number recording, continuous and uninterrupted banknote input, daily banknote keeping, inquiry, etc.. In addition, it can realize recycling at least one denomination of banknotes in circulation.

The bill recycling terminal usually includes a banknote accumulating device, such as a temporary storage device, a cash box, or a banknote output device.

However, when the related banknote accumulating device collects banknotes of different sizes, there is a problem that the stored banknotes are stacked irregularly.

SUMMARY

The present disclosure provides a banknote accumulating device, which can effectively improve the problem that the stored banknotes are stacked irregularly when collecting banknotes of different sizes.

The present disclosure also provides a limiting mechanism, which can be applied to the banknote accumulating device to limit the positions of banknotes of different sizes, so that the banknotes of different sizes can be stacked neatly.

The present disclosure also provides a cash recycling and handling device, which can effectively improve the stacking neatly of banknotes input to the banknote accumulating device to ensure the normal output of banknotes.

In an embodiment, the present disclosure claims a banknote accumulating device, the banknote accumulating device includes:

- a storage chamber for storing banknotes, where an inlet for inputting banknotes is arranged in the upper of the storage chamber;
- a limiting mechanism arranged above the storage chamber, where the limiting mechanism includes a reset member, a driving mechanism and a plurality of limiting members which are capable of moving independently of each other; each of the limiting members are capable of moving between a first position and a second position; the reset member is configured to enable each of the limiting members to have a tendency to move to the first position; the driving mechanism is configured to selectively drive one of the plurality of limiting members to move from the first position to the second position.

The limiting member is configured to be outside the moving path of the banknotes in the storage chamber when the limiting member is at the first position; the limiting member is further configured to enable a limiting part of the limiting member to reach in the moving path to prevent the banknotes from moving further when the limiting member is at the second position; the distances between the positions of the limiting parts of a plurality of limiting members in the moving path and the inlet are different.

In an embodiment, the present disclosure also provides a limiting mechanism, the limiting mechanism includes:

- a mounting frame;
- a plurality of limiting members independently and movably mounted on the mounting frames; each of limiting members is capable of moving between a first position and a second position;
- a reset member configured to enable each of the limiting members to have a tendency to move to the first position;
- a driving mechanism configured to selectively drive one of the plurality of limiting members to move from the first position to the second position.

In an embodiment, the present disclosure also provides a cash recycling and handling device, the cash recycling and handling device includes a banknote accumulating device mentioned above.

In the FIGURE: 10-limiting mechanism; 100-mounting frame; 200-limiting member; 210-supporting member; 212-limiting part; 214-sawtooth structure; 216-second toothed part; 220-rotating shaft; 300-reset member; 400-driving mechanism; 410-bulge; 420-first power shaft; 430-detecting member; 440-sensor; 450-driven pulley; 460-second power shaft; 470-driving pulley; 472-first toothed part; 20-banknote accumulating device; 500-frame; 510-inlet; 520-moving path; 530-storage chamber; 540-side wall; 600-feeding roller; 700-pick-up roller; 800-gate roller; 900-supporting plate; 30-cash recycling and handling device; 31-banknote input device; 32-banknote output device; 33-banknote identification device; 34-circulating box; 35-recycling box; 36-stocktaking box.

DETAILED DESCRIPTION

The described embodiments herein are part, not all, of embodiments of the present disclosure.

On the premise of no conflict, the embodiments of the present disclosure, the features and technical solutions in the embodiments can be combined with each other.

Similar numbers and letters refer to similar items in the following drawings. Therefore, if a feature is defined in one drawing, such feature may not be defined or explained in the subsequent drawings.

In the descriptions of the present disclosure, terms such as "first" and "second" are only used for the purpose of description and are not to be construed as indicating or implying relative importance.

Embodiment I

Figure 1:
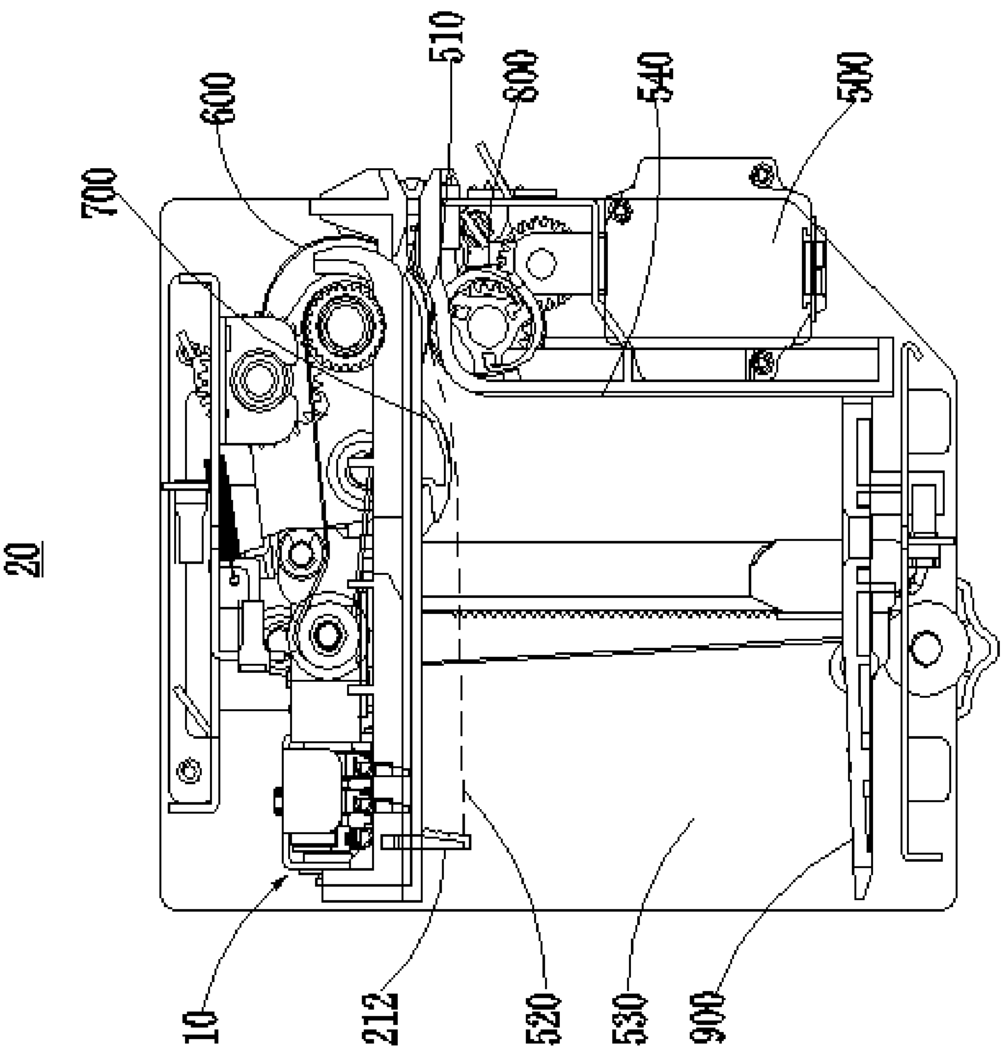
FIG. 1 is a structural schematic view of a banknote accumulating device according to an embodiment of the present disclosure.

FIG. 1 is a structural schematic view of a banknote accumulating device 20 according to an embodiment of the present disclosure. As shown in FIG. 1, an embodiment of the present disclosure provides a banknote accumulating device 20 which is configured to input and storage banknote, and can also be configured to output banknote. The banknote accumulating device 20 includes a frame 500, a feeding roller 600, a gate roller 800 and a limiting mechanism 10.

The frame 500 is provided with a storage chamber 530 for storing banknotes. The storage chamber 530 includes an inlet 510 for inputting or outputting banknotes and a side wall 540 below the inlet 510. A supporting plate 900 for driving the banknotes to lift and fall is provided in the storage chamber 530.

The feeding roller 600 and the gate roller 800 are oppositely arranged at the inlet 510; the feeding roller 600 is arranged to fit with the gate roller 800, so that banknotes are input into the storage chamber 530 one by one and stacked on the supporting plate 900. The feeding roller 600 is rotatably mounted on the frame 500, and the gate roller 800 is oppositely arranged below the feeding roller 600. In the embodiment, the gate roller 800 can rotate in the direction opposite to that of the feeding roller 600. In other embodiments, the gate roller 800 may also be still. When the banknote accumulating device 20 has the function of outputting banknotes, the banknote accumulating device 20 further includes a pick-up roller 700 arranged in the upper of the storage chamber 530. The pick-up roller 700 is configured to drive the banknotes in contact with it to move towards the feeding roller 600, which rotates to drive the banknotes in contact with it to be output from the inlet 510, and the gate roller 800 does not rotate or rotates reversely to prevent the banknotes in contact with it from moving, thus ensuring that a single banknote is output from the inlet 510.

Figure 2:
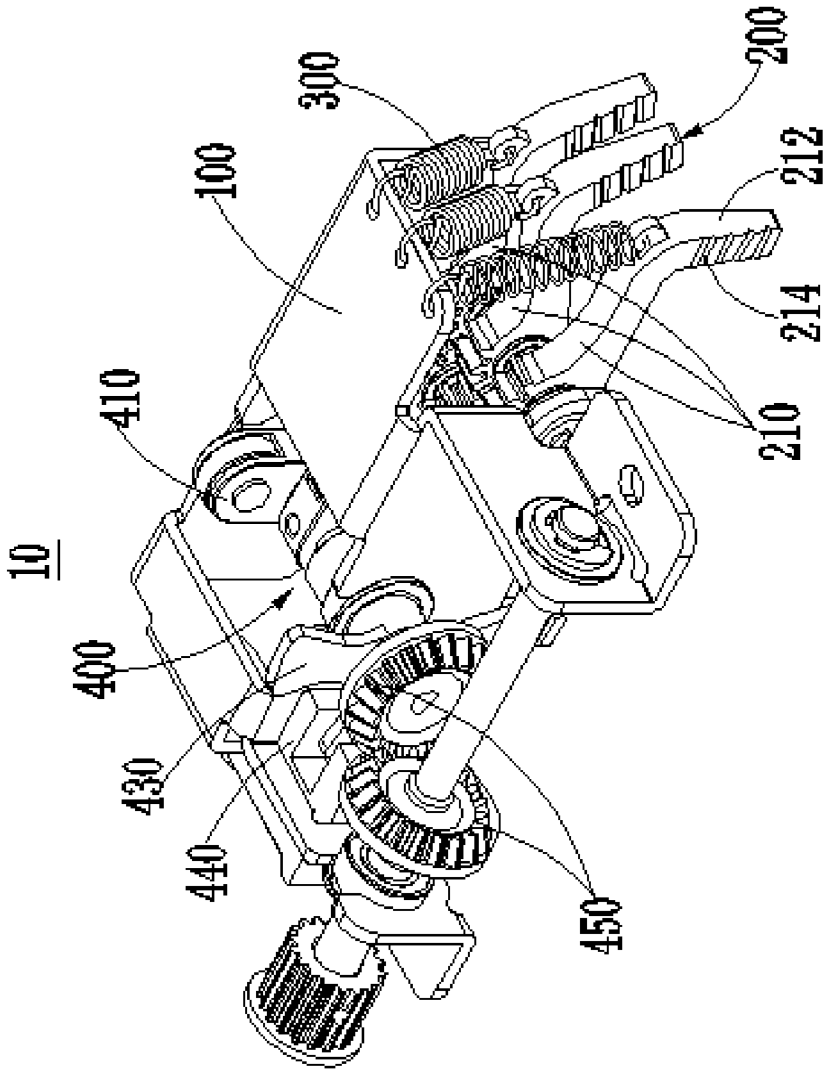
FIG. 2 is a structural schematic view of a limiting mechanism according to an embodiment of the present disclosure.
Figure 3:
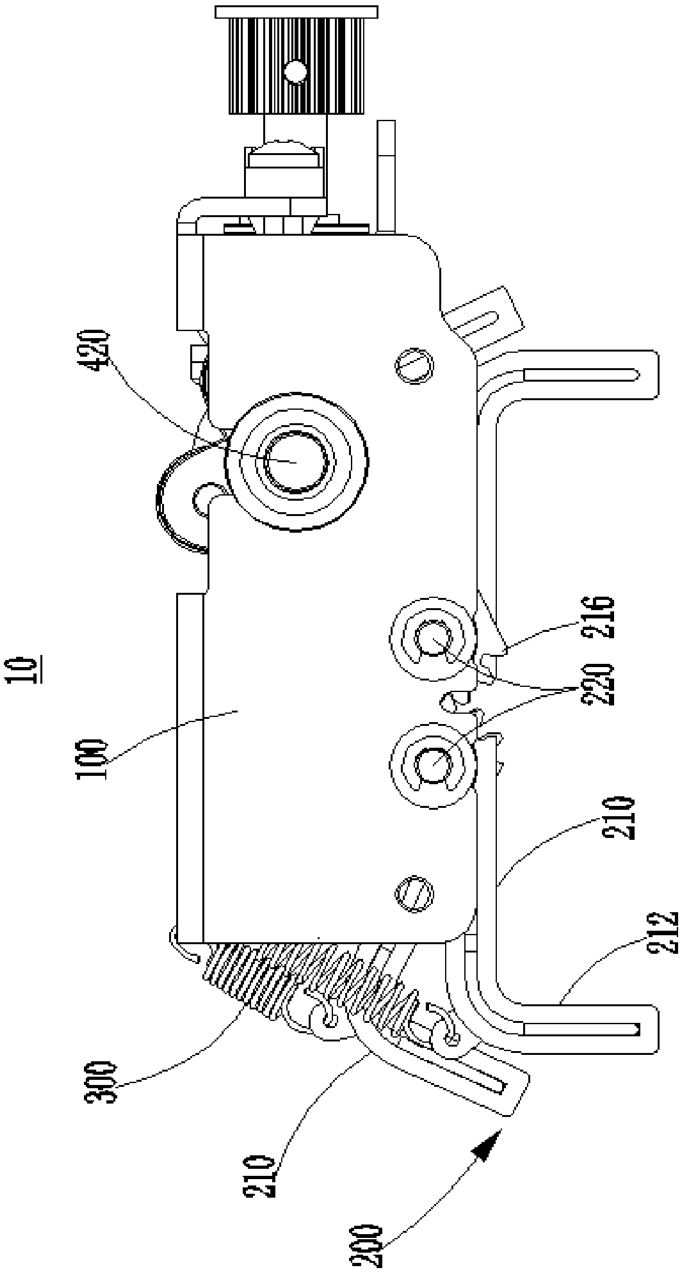
FIG. 3 is a structural schematic view of a limiting mechanism from another angle of view according to an embodiment of the present disclosure.
Figure 4:
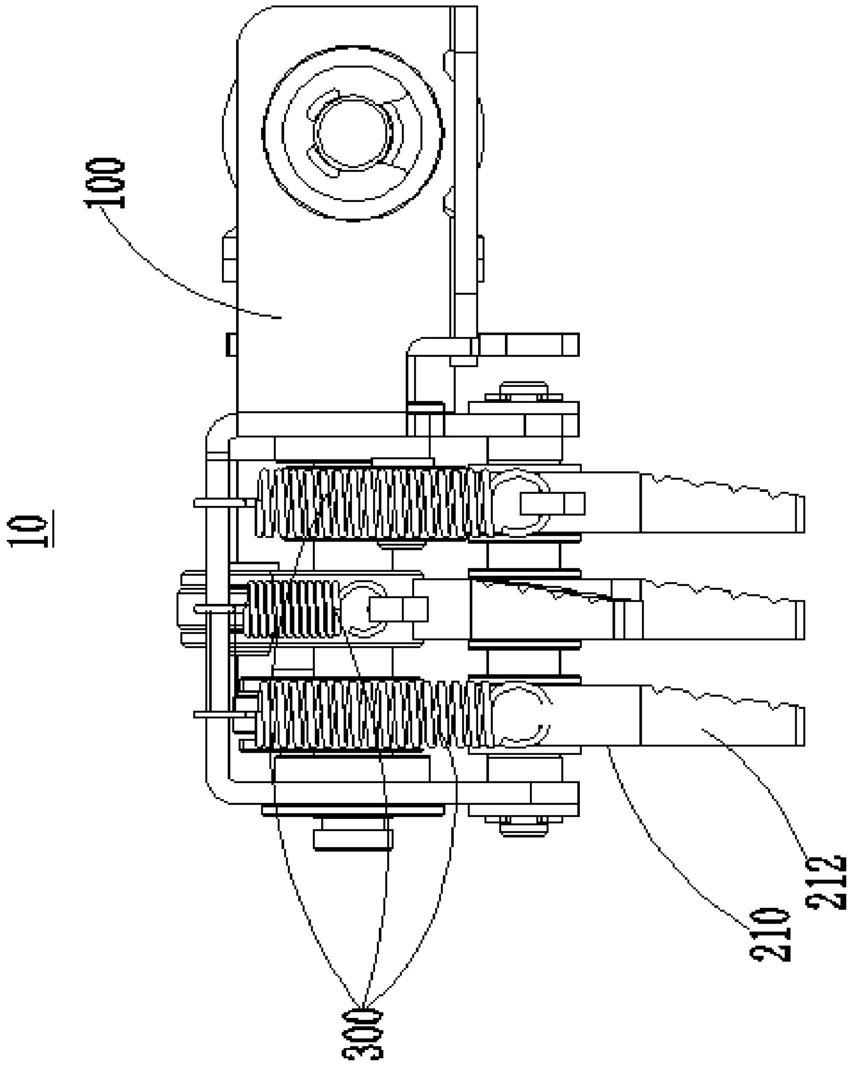
FIG. 4 is a structural schematic view of a limiting mechanism from an additional other angle of view according to an embodiment of the present disclosure.

In an embodiment, the limiting mechanism 10 is arranged above the storage chamber 530, and is configured to limit the positions of banknotes entering the storage chamber 530 from the inlet 510 on the supporting plate 900. FIG. 2 is a structural schematic view of a limiting mechanism 10 according to an embodiment of the present disclosure. FIG. 3 is a structural schematic view of a limiting mechanism 10 from another angle of view according to an embodiment of the present disclosure. FIG. 4 is a structural schematic view of a limiting mechanism 10 from an additional other angle of view according to an embodiment of the present disclosure. As shown in FIG. 2, FIG. 3 and FIG. 4, the limiting mechanism 10 includes a mounting frame 100, a plurality of limiting members 200, a reset member 300 and a driving mechanism 400.

The mounting frame 100 is fixedly mounted on the frame 500 by bolts. The mounting frame 100 is provided with two rotating shafts 220, a first power shaft 420 and a motor (not shown in the figure). The two rotating shafts 220 are respectively fixedly mounted on the mounting frame 100, and are arranged in parallel with each other and at interval. The first power shaft 420 is rotatably mounted on the mounting frame 100 and is in transmission connection with the motor. The first power shaft 420 is arranged parallel to the two rotating shafts 220.

The plurality of limiting members 200 are independently and movably mounted on the mounting frame 100, each of the limiting members 200 has a first position and a second position, and the distances between the plurality of limiting members 200 and the inlet 510 are different. The number of limiting members 200 is equal to the number of size types of the input banknotes. In the embodiment, when banknotes with three different sizes are input, there are three limiting members 200. In other embodiments, when the number of size types of the input banknotes is not equal to three, the number of the limiting members 200 changes accordingly.

Each of the limiting members 200 can move between the first position and the second position. The limiting member 200 is configured to be outside the moving path 520 of the banknotes in the storage chamber 530 when the limiting member 200 is at the first position. The limiting member 200 will not affect the movement of the banknotes in the storage chamber 530. The limiting member 200 is further configured to enable a limiting part 212 of the limiting member 200 to reach in the moving path 520 to prevent the banknotes from moving when the limiting member 200 is at the second position. The distances between the positions of the limiting parts 212 of the plurality of limiting members 200 in the moving path 520 and the inlet 510 are different. Therefore, the positions of banknotes of different sizes on the supporting plate 900 can be limited.

The limiting member 200 can be provided with different structure types according to requirements. In the embodiment, each of limiting members 200 includes two supporting members 210 symmetrically arranged and in transmission connection. Each of supporting members 210 is L-shaped, and one end of each supporting member is rotatably connected with the mounting frame 100 through a rotating shaft 220 and can rotate around the rotating shaft 220. Two supporting members 210 of the same limiting member 200 are respectively rotatably connected with the mounting frame 100 through two rotating shafts 220. The limiting part 212 is arranged at one end of the supporting member 210 away from the rotating shaft 220. The limiting part 212 is provided with a sawtooth structure 214 for supporting the edge of a banknote. The sawtooth structure 214 prevents the front end of the banknote from falling after abutting with the limiting part 212, and the banknote can be kept as horizontal as possible in the storage chamber 530, so that banknotes can be stacked on the supporting plate 900 in order.

Figure 5:
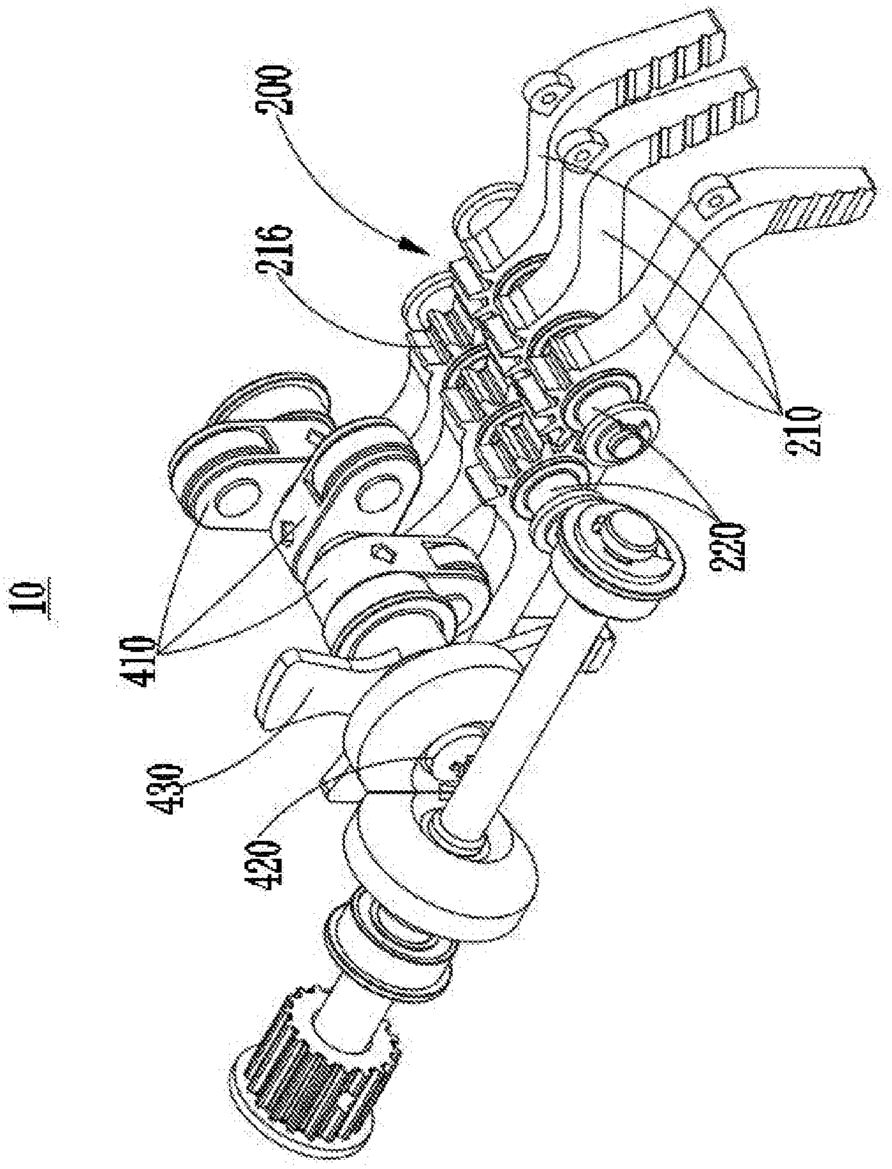
FIG. 5 is a structural schematic view of a limiting mechanism after the mounting frame being concealed according to an embodiment of the present disclosure.

Two supporting members 210 can be provided with different transmission modes according to requirements. FIG. 5 is a structural schematic view of a limiting mechanism after the mounting frame being concealed according to an embodiment of the present disclosure. In the embodiment, one end of each of the two supporting members 210 close to the corresponding rotating shaft 220 is provided with a second toothed part 216, and the second toothed parts 216 of the two supporting members 210 are engaged with each other. Due to the transmission action of the second toothed portion 216, one of the two supporting members 210 is driven to rotate, the other one can be driven to rotate at the same time. Namely, when the limiting part 212 of one of the two supporting members 210 reaches in the moving path 520, the other one will also reaches in the moving path 520, two positions of one side of the banknote can be blocked at the same time, thus effectively preventing the banknote from tilting after abutting with the limiting part 212.

In other embodiments, the two supporting members 210 can also be provided with other transmission modes, such as the pulley transmission. In an embodiment, the two supporting members 210 are respectively provided with a pulley on their respective rotating shafts 220, and a belt is provided between the two pulleys. In other embodiments, each of limiting members 200 may only include one supporting member 210, and at this time, only one rotating shaft 220 may be provided. In other embodiments, each of limiting members 200 can be provided with other structures, such as a liftable baffle. A plurality of baffles are arranged at interval along the extending direction of the moving path 520, and the limiting part 212 is arranged at the bottom of the baffle.

The reset member 300 is configured to enable each of the limiting members 200 to have a tendency to move to the first position. The reset member 300 can be provided with different structures according to requirements. In the embodiment, the reset member 300 includes a plurality of springs, which correspond to the plurality of limiting members 200 one-to-one. One end of each spring is connected with the mounting frame 100, and the other end is connected with one of the supporting members 210 of the corresponding limiting member 200. Under the elastic action of the plurality of springs, each supporting member 210 connected with the springs has a tendency to rotate to the first position, so that the other supporting member 210 also has a tendency to rotate to the first position.

In other embodiments, the reset member 300 may be provided with other structure types, such as a plurality of elastic ropes.

The driving mechanism 400 is configured to selectively drive one of the plurality of limiting members 200 to move from the first position to the second position. In the embodiment, the driving mechanism 400 is configured to selectively drive one of the plurality of supporting members 210 not connected with springs to rotate from the first position to the second position. The driving mechanism 400 includes a plurality of driving members; the plurality of driving members are respectively rotatably mounted on the mounting frame 100 and correspond to the positions of the plurality of limiting members 200 one-to-one (i.e., the driving mechanism 400 includes a plurality of rotatable driving members. The positions of the plurality of rotatable driving members correspond to those of the plurality of limiting members 200 one-to-one). Each of the driving members is configured to drive the corresponding limiting member 200 to move from the first position to the second position. The driving member can be provided with different structure types according to requirements. In the embodiment, a plurality of driving members are bulges 410, and each bulge 410 can rotate to drive the corresponding limiting member 200 to move from the first position to the second position. The plurality of bulges 410 are rotatably mounted on the mounting frame 100 through the first power shaft 420, so as to reduce the number of motors and simplify the transmission structure. In an embodiment, the plurality of bulges 410 are fixedly arranged on the first power shaft 420 in turn along the axial direction of the first power shaft 420; projections of the plurality of bulges 410 in the axial direction of the first power shaft 420 do not overlap each other. In the embodiment, the included angle between any two adjacent bulges

410 along the axial direction of the first power shaft 420 is 90°. In other embodiments, the included angle between any two adjacent bulges 410 may be other value, such as 60°.

Since the projections of the plurality of bulges 410 in the axial direction of the first power shaft 420 do not overlap each other, when one of the plurality of bulges 410 pushes the corresponding limiting member 200 to move, the rest of the bulges 410 are not in contact with the corresponding limiting members 200. Therefore, when the plurality of bulges 410 rotate along with the rotation of the first power shaft 420, one of the plurality of limiting members 200 can be selectively driven to move from the first position to the second position.

As shown in FIG. 2-FIG. 5, in the embodiment, the driving mechanism 400 further includes a sensor 440, a controller (not shown in the figure) and a plurality of detecting members 430. The sensor 440 is fixedly arranged on the mounting frame 100, and the controller is electrically connected with the sensor 440 and the motor at the same time. The plurality of detecting members 430 are respectively arranged on the first power shaft 420 and can be in fit with or separated from the sensor 440 along with the rotation of the first power shaft 420. The positions of the plurality of detecting members 430 correspond to those of the plurality of bulges 410 one-to-one. In the embodiment, the sensor 440 is a photoelectric transducer and includes a light emitter and a light receiver. When the light emitted by the light emitter is received by the light receiver, the sensor 440 outputs a first detecting signal, such as a high level. When the light emitted by the light emitter cannot be received by the light receiver, the sensor 440 outputs a second detecting signal, such as a low level. When the detecting member 430 is in fit with the sensor 440, the detecting member 430 is located between the light emitter and the light receiver. The light emitted by the light emitter cannot be received by the light receiver, and the sensor 440 outputs a second detecting signal. When the detecting member 430 is separated from the sensor 440, the light emitted by the light emitter is received by the light receiver, and the sensor 440 outputs a first detecting signal. In the embodiment, the projections of the plurality of detecting members 430 and the plurality of bulges 410 in the axial direction of the first power shaft 420 correspond to and overlap each other one-to-one. In other embodiments, the projections of the plurality of detecting members 430 and the plurality of bulges 410 may not overlap each other, as long as they correspond to each other. Namely, when the detecting member 430 is in fit with the sensor 440, the bulge 410 is also in a position abutting with the corresponding limiting member 200. At this time, the bulge 410 drives the limiting member 200 to move from the first position to the second position.

When the driving mechanism 400 drives one of the plurality of limiting members 200 to move from the first position to the second position, the controller controls the motor to rotate, and the motor drives the first power shaft 420 to rotate. When the limiting member 200 moves from the first position to the second position driven by the corresponding bulge 410, the detecting member 430 corresponding to the bulge 410 is just in fit with the sensor 440. At this time, the sensor 440 will send a signal to the controller. After receiving the signal, the controller controls the motor to stop rotating, so as to keep the corresponding limiting member 200 in the second position; the limiting part 212 of the limiting member 200 is arranged at a certain distance with respect to the inlet 510, so as to prevent the banknotes of the corresponding sizes from moving.

The operating principle and process of the banknote accumulating device 20 are as follows:

When the banknote accumulating device 20 does not work, under the action of the reset member 300, the plurality of limiting members 200 of the limiting mechanism 10 are in the first position, and the supporting plate 900 is located at a position near the inlet 510 in the storage chamber 530. When the banknote accumulating device 20 works, under the joint action of the feeding roller 600 and the gate roller 800, banknotes are fed into the storage chamber 530 one by one from the inlet 510. According to the sizes of banknotes, the controller controls the driving mechanism 400 to drive one of the plurality of limiting members 200 to move from the first position to the second position, so that the limiting part 212 of the limiting member 200 reaches in the moving path 520 of the banknotes in the storage chamber 530. The distance between the limiting part 212 of the limiting member 200 and the inlet 510 is match with the size of the banknote in the extending direction of the moving path 520. After the banknote enters the storage chamber 530, the limiting part 212 of the limiting member 200 located on the moving path 520 prevents the banknote from moving further. When the front end of the banknote abuts with the limiting part 212, the banknote stops. And the rear end of the banknote is aligned with the side wall 540 of the storage chamber 530 below the inlet 510.

In the above process, a limiting part 212 of limiting member 200 is selected to reach in the moving path 520 according to the size of the input banknote. In an embodiment, the distance between the position in the moving path 520 of the limiting part 212 of the limiting member 200 reaching in the moving path 520 and the side wall 540 of the storage chamber 530 below the inlet 510 (hereinafter referred to as the limiting distance) shall be matched with the size of the input banknote in the extending direction of the moving path 520 (hereinafter referred to as the extending size).

For example, if banknotes with three different sizes are input into the banknote accumulating device 20 according to the embodiment, the limiting mechanism 10 accordingly includes three limiting members 200. If the limiting distance of the limiting part 212 of the first limiting member 200 is matched with the extending size of the first banknote, the limiting distance of the limiting part 212 of the second limiting member 200 is matched with the extending size of the second banknote, and the limiting distance of the limiting part 212 of the third limiting member 200 is matched with the extending size of the third banknote, the limiting part 212 of the first limiting member 200 is driven by the driving mechanism 400 to reach in the moving path 520 when the first banknote is input, the limiting part 212 of the second limiting member 200 is driven by the driving mechanism 400 to reach in the moving path 520 when the second banknote is input, and the limiting part 212 of the third limiting member 200 is driven by the driving mechanism 400 to reach in the moving path 520 when the third banknote is input.

When completely entering the storage chamber 530, a banknote will be stacked on the supporting plate 900; afterwards, the supporting plate 900 will be lowered for a certain distance. And then, the next banknote will be input; such steps will be performed in turn in a circulated manner until all banknotes are fed into the storage chamber 530 and stacked on the supporting plate 900. Since the rear end of each banknote is aligned with the side wall 540, banknotes can be stacked neatly.

The banknote accumulating device 20 includes a storage chamber 530 and a limiting mechanism 10; the storage chamber 530 includes an inlet 510 for inputting banknotes; the limiting mechanism 10 includes a plurality of limiting members 200, a reset member 300 and a driving mechanism 400. The plurality of limiting members 200 are independently and movably mounted above the storage chamber 530. The reset member 300 is configured to enable each of limiting members 200 to have a tendency to move to a first position; the driving mechanism 400 is configured to selectively drive one of the plurality of limiting members 200 to move from a first position to a second position. The limiting member 200 is configured to be outside the moving path 520 of the banknotes in the storage chamber 530 when the limiting member 200 is at the first position. The limiting member 200 is further configured to enable a limiting part 212 of the limiting member 200 to reach in the moving path 520 to prevent the banknotes from moving further when the limiting member 200 is at the second position. The distances between the positions of the plurality of limiting parts 212 in the moving path 520 and the inlet 510 are different. Thus, the positions of banknotes of different sizes can be limited, and those banknotes can be stacked neatly in the storage chamber 530, which effectively improves the problem that the stored banknotes are stacked irregularly when collecting banknotes of different sizes by the banknote accumulating device 20.

Embodiment II

Figure 6:
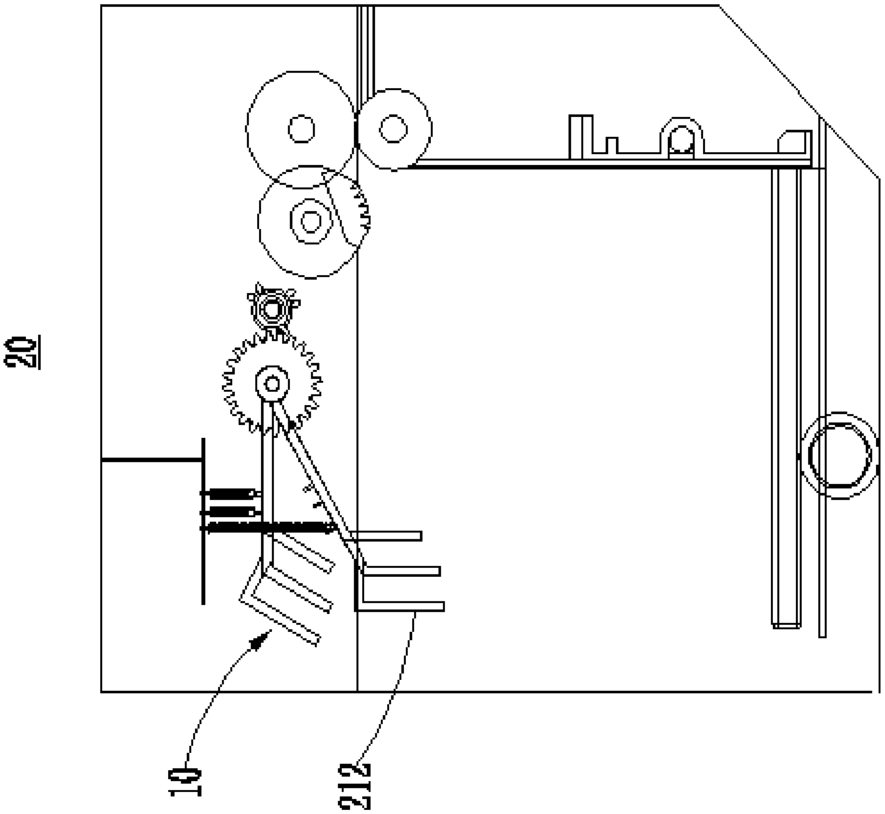
FIG. 6 is a structural schematic view of another banknote accumulating device according to an embodiment of the present disclosure.

FIG. 6 is a structural schematic view of another banknote accumulating device 20 according to an embodiment of the present disclosure. As shown in FIG. 6, the basic structure, working principle and technical effect of the banknote accumulating device 20 according to the embodiment are basically the same as those of the banknote accumulating device 20 in Embodiment I, except for the structures and positions of the limiting member 200 and the driving member.

Figure 7:
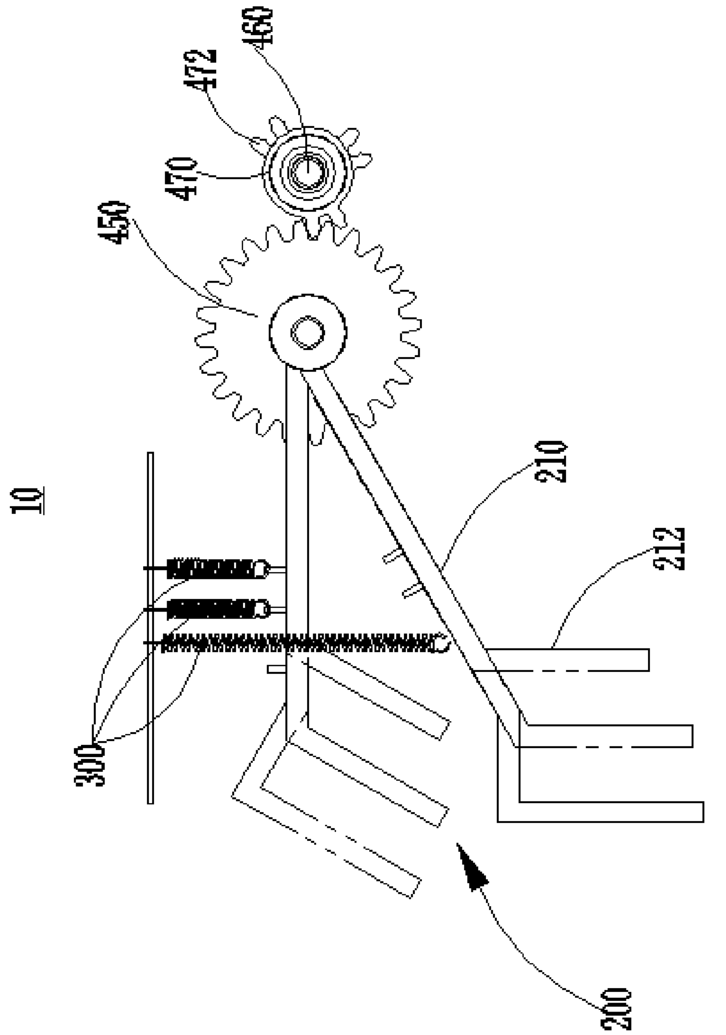
FIG. 7 is a structural schematic view of another limiting mechanism according to an embodiment of the present disclosure.

FIG. 7 is a structural schematic view of another limiting mechanism 10 according to an embodiment of the present disclosure. As shown in FIG. 7, in the embodiment, each of limiting members 200 only includes one supporting member 210. The first ends of the supporting members 210 of the plurality of limiting members 200 are coaxially arranged. The second ends of the supporting members 210 of the plurality of limiting members 200 are respectively provided with the limiting parts 212. The distances between the first ends and the second ends of the supporting members 210 of all the limiting members 200 are different. The moving path 520 of the banknotes in the storage chamber 530 extends along the direction from the first end to the second end of the supporting member 210, so that the distances between the positions of the limiting parts 212 of a plurality of limiting members 200 in the moving path 520 and the inlet 510 are different; therefore, the positions of banknotes of different sizes can be limited.

Figure 8:
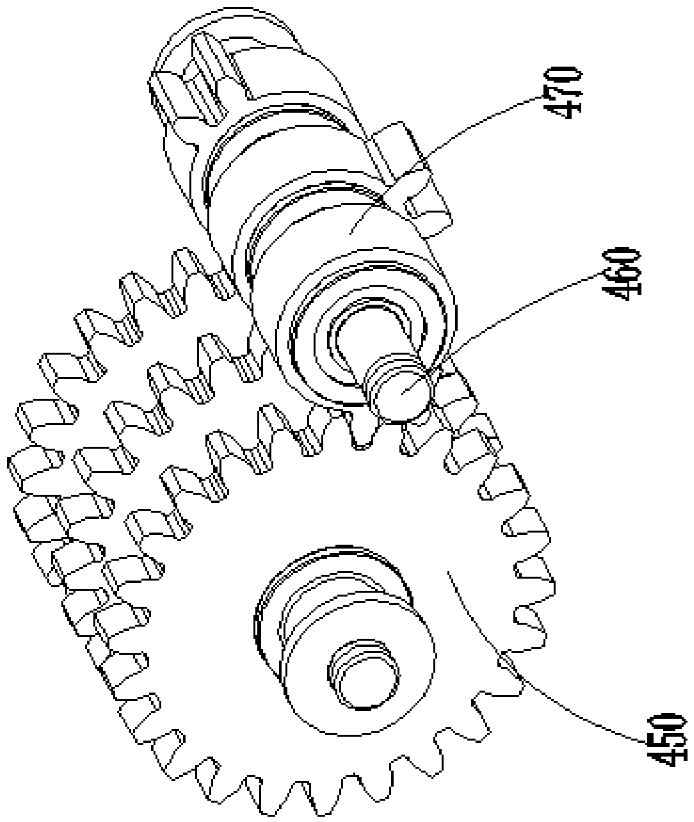
FIG. 8 is a structural schematic view of a driving mechanism according to an embodiment of the present disclosure.

FIG. 8 is a structural schematic view of a driving mechanism 400 according to an embodiment of the present disclosure. As shown in FIG. 8, in the embodiment, each of the driving members includes a driving pulley 470 and a driven pulley 450 in transmission connection. The plurality of driven pulleys 450 are connected with the plurality of limiting members 200 in one-to-one correspondence. Each of the driven pulleys 450 can rotate driven by the driving pulley 470 in transmission connection with the driven pulley 450, thereby drives the corresponding limiting member 200 to rotate from the first position to the second position.

As shown in FIG. 7 and FIG. 8, the driving pulley 470 and the driven pulley 450 can be provided with different transmission modes according to requirements. In the embodiment, the plurality of driven pulleys 450 are gears. The driving mechanism 400 further includes a second power shaft 460; the plurality of driving pulleys 470 are fixedly arranged on the second power shaft 460 along the axial direction of the second power shaft 460. The plurality of driving pulleys 470 are coaxially arranged to reduce the number of motors and simplify the transmission structure. Each of the driving pulleys 470 is provided with a first toothed part 472, which is configured to mesh with the driven pulley 450. Projections of the first toothed parts 472 of the plurality of driving pulleys 470 in the axial direction of the second power shaft 460 do not overlap each other.

Since the projections of the first toothed parts 472 of the plurality of driving pulleys 470 in the axial direction of the second power shaft 460 do not overlap each other, when the first toothed part 472 of one of the plurality of driving pulleys 470 meshes with the corresponding driven pulley 450 and drives the corresponding limiting member 200 to move, the first toothed parts 472 of the remaining driving pulleys 470 do not mesh with the corresponding driven pulley 450. Therefore, the plurality of driving pulleys 470 rotate along with the rotation of the second power shaft 460 to selectively drive one of the plurality of driven pulleys 450, thereby driving one of the plurality of limiting members 200 to rotate from the first position to the second position.

Figure 9:
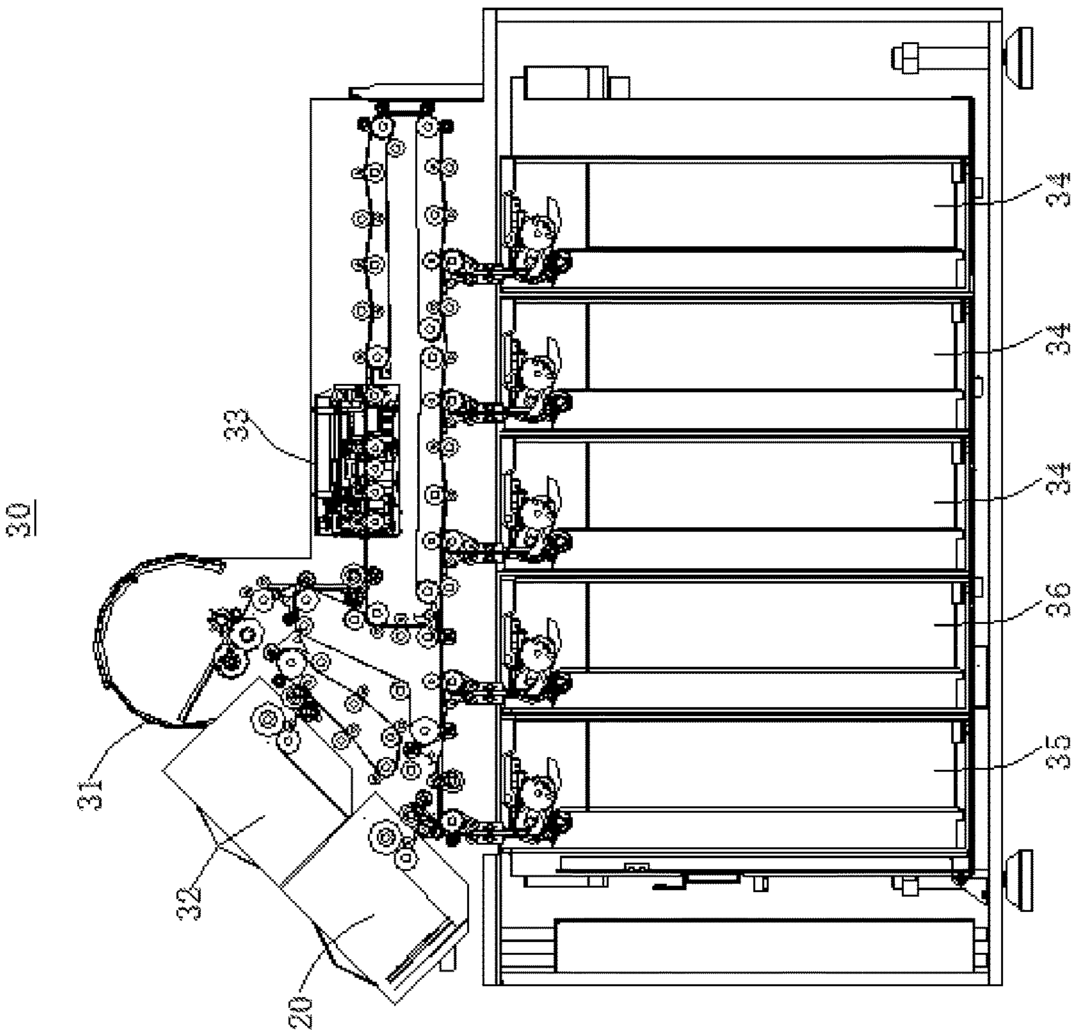
FIG. 9 is a structural schematic view of a cash recycling and handling device according to an embodiment of the present disclosure.

FIG. 9 is a structural schematic view of a cash recycling and handling device 30 according to an embodiment of the present disclosure. As shown in FIG. 9, the embodiment provides a cash recycling and handling device 30 including a banknote input device 31, a banknote output device 32, a banknote accumulating device 20 in Embodiment I or Embodiment II, a banknote identification device 33, a circulating box 34, a recycling box 35 and a stocktaking box 36. The above device can transfer the position of banknotes through a passage.

The banknote identification device 33 can identify genuine banknotes, counterfeit banknotes, banknotes available for circulating and banknotes not available for circulating, etc., and it also can count the banknotes.

In the embodiment, three circulating boxes 34 are provided. In other embodiments, the number of the circulating boxes 34 is not limited.

The cash recycling and handling device 30 according to the embodiment can be used for deposit, withdrawal and stocktaking.

In an embodiment, a method for deposit is provided:

After the user puts banknotes on the supporting plate of the banknote input device 31 and the banknotes are conveyed to the banknote identification device 33 through the banknote input passage, the banknote identification device 33 identifies the banknotes. The identified genuine banknotes are conveyed to the banknote accumulating device 20, and the identified unacceptable banknotes are conveyed to the banknote output device 32. After the user confirms the deposit, the banknotes in the banknote accumulating device 20 are conveyed to the banknote identification device 33 again. After identification, the banknotes available for circulating are eventually conveyed to the circulating box 34, and the banknotes not available for circulating are conveyed to the recycling box 35.

In an embodiment, a method for withdrawal is provided:

After the user confirms the withdrawal, the banknotes will be conveyed to a passage from the banknote circulating box 34. The banknotes are identified by the banknote identification device 33 first. The banknotes available for circulating are conveyed to the banknote output device 32, and the banknotes not available for circulating are conveyed to the banknote recovering box 35.

In an embodiment, a method for stocktaking is provided:

The banknotes in one circulating box 34 of the plurality of circulating boxes 34 are conveyed to the banknote identification device 33 through a passage. The banknote identification device 33 counts the banknotes in the circulating box 34 and sends the counted banknotes to the stocktaking box 36. After the counting of all the banknotes in the circulating box 34, the banknotes of the stocktaking box 36 return to the circulating box 34 through the passage.

In an embodiment, another method for stocktaking is provided:

All the banknotes in one circulating box 34 of the plurality of circulating boxes 34 are conveyed to the stocktaking box 36 through a passage. Then the banknotes are orderly conveyed to the banknote identification device 33 through the passage. The banknotes are conveyed to the corresponding circulating box 34 after being counted by the banknote identification device 33.

The cash recycling and handling device 30 can effectively improve the stacking neatly of banknotes input into the banknote accumulating device 20, so as to facilitate the normal output of banknotes and reduce the defect of the bill recycling machine in the related art.

According to an embodiment of the present disclosure, the positions of banknotes of different sizes can be limited, so that the banknotes of different sizes can be stacked neatly in the storage chamber 530, which effectively improves the problem that the stored banknotes are stacked irregularly when collecting banknotes of different sizes by the banknote accumulating device in the related art.

The limiting mechanism according to an embodiment of the present disclosure is arranged in the above-mentioned banknote accumulating device 20 to limit the positions of banknotes of different sizes, so that the banknotes of different sizes can be stacked neatly, effectively reducing the defect of the banknote accumulating device in the related art.

What is claimed is:

1. A banknote accumulating device, comprising:

a storage chamber for storing banknotes, wherein an inlet for inputting banknotes is arranged in the upper of the storage chamber;

a limiting mechanism arranged above the storage chamber, wherein the limiting mechanism comprises a reset member, a driving mechanism and a plurality of limiting members which are capable of moving independently of each other; each of the plurality of limiting members are capable of moving between a first position and a second position; the reset member is configured to enable each of the plurality of limiting members to have a tendency to move to the first position; the driving mechanism is configured to selectively drive one limiting member of the plurality of limiting members to move from the first position to the second position;

wherein the limiting member is configured to be outside a moving path of the banknotes in the storage chamber when the limiting member is at the first position; the limiting member is further configured to enable a limiting part of limiting parts of the plurality of limiting members to reach in the moving path to prevent the banknotes from moving further when the limiting member is at the second position; the distances between positions of the limiting parts of the plurality of limiting members in the moving path and the inlet are different; and wherein the limiting member comprises an L-shaped supporting member which is capable of rotating around a rotating shaft, and the limiting part is arranged at one end of the supporting member away from the rotating shaft the driving mechanism is configured to selectively drive one of a plurality of supporting members and enable the corresponding limiting member to rotate from the first position to the second position, and the limiting part is configured to reach in the moving path when the corresponding limiting member is in the second position.

2. The banknote accumulating device according to claim 1, wherein the driving mechanism comprises a plurality of rotatable driving members, and positions of the plurality of driving members are in one-to-one correspondence with positions of the plurality of limiting members, and each of the driving members is configured to drive the corresponding limiting member to move from the first position to the second position.

3. The banknote accumulating device according to claim 2, wherein one of the driving members is a bulge, and the bulge is capable of rotating to drive the corresponding limiting member to move from the first position to the second position.

4. The banknote accumulating device according to claim 3, wherein the driving mechanism further comprises a first power shaft, and a plurality of bulges are fixedly arranged on the first power shaft in turn along an axial direction of the first power shaft; projections of the plurality of bulges in the axial direction of the first power shaft do not overlap each other; the plurality of bulges are capable of rotating along with the rotation of the first power shaft, so that one of the plurality of bulges drives the corresponding limiting member to move from the first position to the second position.

5. The banknote accumulating device according to claim 4, wherein the driving mechanism further comprises a sensor and a plurality of detecting members which are respectively arranged on the first power shaft and are capable of being in fit with or separated from the sensor along with the rotation of the first power shaft; positions of the plurality of detecting members are in one-to-one correspondence with positions of the plurality of bulges.

6. The banknote accumulating device according to claim 2, wherein each of the driving members comprises a driving pulley of a plurality of driving pulleys and a driven pulley of a plurality of driven pulleys, the driving pulley and the driven pulley are in transmission connection; the plurality of driven pulleys are connected with the plurality of limiting members in one-to-one correspondence; each of the driven pulleys is capable of rotating driven by the driving pulley in transmission connection with the driven pulley, and driving the limiting member connected with the driven pulley to rotate from the first position to the second position.

7. The banknote accumulating device according to claim 6, wherein the plurality of driven pulleys are all gears, and the driving mechanism further comprises a second power shaft, wherein the plurality of driving pulleys are fixedly arranged on the second power shaft along an axial direction of the second power shaft; each of the driving pulleys is provided with a first toothed part; the first toothed part is configured to mesh with the driven pulley which is in transmission connection with the driving pulley; projections of the first toothed parts of the plurality of driving pulleys in the axial direction of the second power shaft do not overlap each other; and the plurality of driving pulleys are capable of rotating along with the rotation of the second power shaft to selectively drive one of the plurality of driven pulleys to rotate, thereby driving one of the plurality of limiting members to rotate from the first position to the second position.

8. The banknote accumulating device according to claim 6, wherein each of the limiting members comprises a supporting member.

9. The banknote accumulating device according to claim 8, wherein first ends of the supporting members of the plurality of limiting members are coaxially arranged; second ends of the supporting members of the plurality of limiting members are respectively provided with the limiting parts; distances between the first ends and the second ends of all the supporting members are different.

10. The banknote accumulating device according to claim 1, wherein the limiting member comprises two supporting members symmetrically arranged and in transmission connection each other.

11. The banknote accumulating device according to claim 10, wherein rotating shafts of the two supporting members are arranged in parallel and at interval, and one end of each of the two supporting members close to the corresponding rotating shaft is provided with a second toothed part; the second toothed parts of the two supporting members are engaged with each other.

12. A limiting mechanism, comprising:

a mounting frame;

a plurality of limiting members independently and movably mounted on the mounting frame, and each of the plurality of limiting members is capable of moving between a first position and a second position;

a reset member configured to enable each of the plurality of limiting members to have a tendency to move to the first position; and a driving mechanism configured to selectively drive one limiting member of the plurality of limiting members to move from the first position to the second position;

wherein the limiting member comprises an L-shaped supporting member which is capable of rotating around a rotating shaft, and a limiting part of the limiting member is arranged at one end of the supporting member away from the rotating shaft the driving mechanism is configured to selectively drive one of a plurality of supporting members and enable the corresponding limiting member to rotate from the first position to the second position, and the limiting part is configured to reach in a moving path of banknotes in a storage chamber when the corresponding limiting member is in the second position.

13. A cash recycling and handling device, comprising a banknote accumulating device, wherein the banknote accumulating device comprises:

a storage chamber for storing banknotes, wherein an inlet for inputting banknotes is arranged in the upper of the storage chamber;

a limiting mechanism arranged above the storage chamber, wherein the limiting mechanism comprises a reset member, a driving mechanism and a plurality of limiting members which are capable of moving independently of each other; each of the plurality of limiting members are capable of moving between a first position and a second position; the reset member is configured to enable each of the plurality of limiting members to have a tendency to move to the first position; the driving mechanism is configured to selectively drive one limiting member of the plurality of limiting members to move from the first position to the second position;

wherein the limiting member is configured to be outside a moving path of the banknotes in the storage chamber when the limiting member is at the first position; the limiting member is further configured to enable a limiting part of limiting parts of the plurality of limiting members to reach in the moving path to prevent the banknotes from moving further when the limiting member is at the second position; the distances between positions of the limiting parts of the plurality of limiting members in the moving path and the inlet are different; and wherein the limiting member comprises an L-shaped supporting member which is capable of rotating around a rotating shaft, and the limiting part is arranged at one end of the supporting member away from the rotating shaft the driving mechanism is configured to selectively drive one of a plurality of supporting members and enable the corresponding limiting member to rotate from the first position to the second position, and the limiting part is configured to reach in the moving path when the corresponding limiting member is in the second position.

14. The cash recycling and handling device according to claim 13, wherein the driving mechanism comprises a plurality of rotatable driving members, and positions of the plurality of driving members are in one-to-one correspondence with positions of the plurality of limiting members, and each of the driving members is configured to drive the corresponding limiting member to move from the first position to the second position.

15. The cash recycling and handling device according to claim 14, wherein one of the driving members is a bulge, and the bulge is capable of rotating to drive the corresponding limiting member to move from the first position to the second position.

16. The cash recycling and handling device according to claim 15, wherein the driving mechanism further comprises a first power shaft, and a plurality of bulges are fixedly arranged on the first power shaft in turn along an axial direction of the first power shaft; projections of the plurality of bulges in the axial direction of the first power shaft do not overlap each other; the plurality of bulges are capable of rotating along with the rotation of the first power shaft, so that one of the plurality of bulges drives the corresponding limiting member to move from the first position to the second position.

17. The cash recycling and handling device according to claim 16, wherein the driving mechanism further comprises a sensor and a plurality of detecting members which are respectively arranged on the first power shaft and are capable of being in fit with or separated from the sensor along with the rotation of the first power shaft; positions of the plurality of detecting members are in one-to-one correspondence with positions of the plurality of bulges.

18. The cash recycling and handling device according to claim 14, wherein each of the driving members comprises a driving pulley of a plurality of driving pulleys and a driven pulley of a plurality of driven pulleys, the driving pulley and the driven pulley are in transmission connection; the plurality of driven pulleys are connected with the plurality of limiting members in one-to-one correspondence; each of the driven pulleys is capable of rotating driven by the driving pulley in transmission connection with the driven pulley, and driving the limiting member connected with the driven pulley to rotate from the first position to the second position.

19. The cash recycling and handling device according to claim 18, wherein the plurality of driven pulleys are all gears, and the driving mechanism further comprises a second power shaft, wherein the plurality of driving pulleys are fixedly arranged on the second power shaft along an axial direction of the second power shaft; each of the driving pulleys is provided with a first toothed part; the first toothed part is configured to mesh with the driven pulley which is in transmission connection with the driving pulley; projections of the first toothed parts of the plurality of driving pulleys in the axial direction of the second power shaft do not overlap each other; and the plurality of driving pulleys are capable of rotating along with the rotation of the second power shaft to selectively drive one of the plurality of driven pulleys to rotate, thereby driving one of the plurality of limiting members to rotate from the first position to the second position.

20. The cash recycling and handling device according to claim 13, wherein the limiting member comprises two supporting members symmetrically arranged and in transmission connection each other.

* * * * *